(12) United States Patent
Kato et al.

(10) Patent No.: US 6,476,620 B2
(45) Date of Patent: Nov. 5, 2002

(54) ELECTROSTATIC CAPACITY SENSOR

(75) Inventors: Ryochi Kato, Yachiyo (JP); Hideto Kato, Yachiyo (JP)

(73) Assignee: KS Techno Co., Ltd., Tokyo (JP)

( * ) Notice: Subject to any disclaimer, the term of this patent is extended or adjusted under 35 U.S.C. 154(b) by 0 days.

(21) Appl. No.: 09/948,284

(22) Filed: Sep. 6, 2001

(65) Prior Publication Data

US 2002/0024344 A1 Feb. 28, 2002

Related U.S. Application Data

(63) Continuation of application No. 09/254,467, filed as application No. PCT/JP97/03154 on Sep. 8, 1997.

(51) Int. Cl.[7] .............................................. G01R 27/26
(52) U.S. Cl. ...................................................... 324/662
(58) Field of Search ................................ 324/452, 660, 324/661, 662, 664, 671, 678, 679, 680, 716; 340/870.37; 73/862.043, 304 C, 514.18, 514.35

(56) References Cited

U.S. PATENT DOCUMENTS

| | | | |
|---|---|---|---|
| 4,943,889 A | * 7/1990 | Ohmatoi | 361/284 |
| 5,454,266 A | * 10/1995 | Chevroulet | 73/514.18 |
| 5,461,319 A | * 10/1995 | Peters | 324/660 |
| 5,639,973 A | * 6/1997 | Okada | 73/862.043 |
| 5,760,589 A | * 6/1998 | Katsuie | 324/452 |

FOREIGN PATENT DOCUMENTS

| | | |
|---|---|---|
| JP | 58-7503 | 1/1983 |
| JP | 3-37501 | 2/1991 |

* cited by examiner

Primary Examiner—N. Le
Assistant Examiner—Etienne LeRoux
(74) Attorney, Agent, or Firm—Marger Johnson & McCollom, PC

(57) ABSTRACT

An electrostatic capacity sensor includes an electrostatic capacity type detection element in which a detection electrode, a ground electrode and a charge plate interposed between the detection electrode and the ground electrode are arranged in a state that they are isolated to each other; a detection circuit for detecting changes in capacitance of the detection electrode caused by an object to be detected; and a power supply for supplying electrical power to the detection circuit. Since the electrostatic capacity sensor is provided with the charge plate between the detection electrode and the charge plate, it is possible to improve the sensitivity of the detection element, so that it is possible to increase the detection distance. In addition, the variations in the capacitance of the detection element due to the changes in the ambient conditions can be reduced. In this way, the ratio of signal to noise (the ratio of S/N) can be increased, thereby enabling to improve the detection precision of the electrostatic capacity sensor.

13 Claims, 12 Drawing Sheets

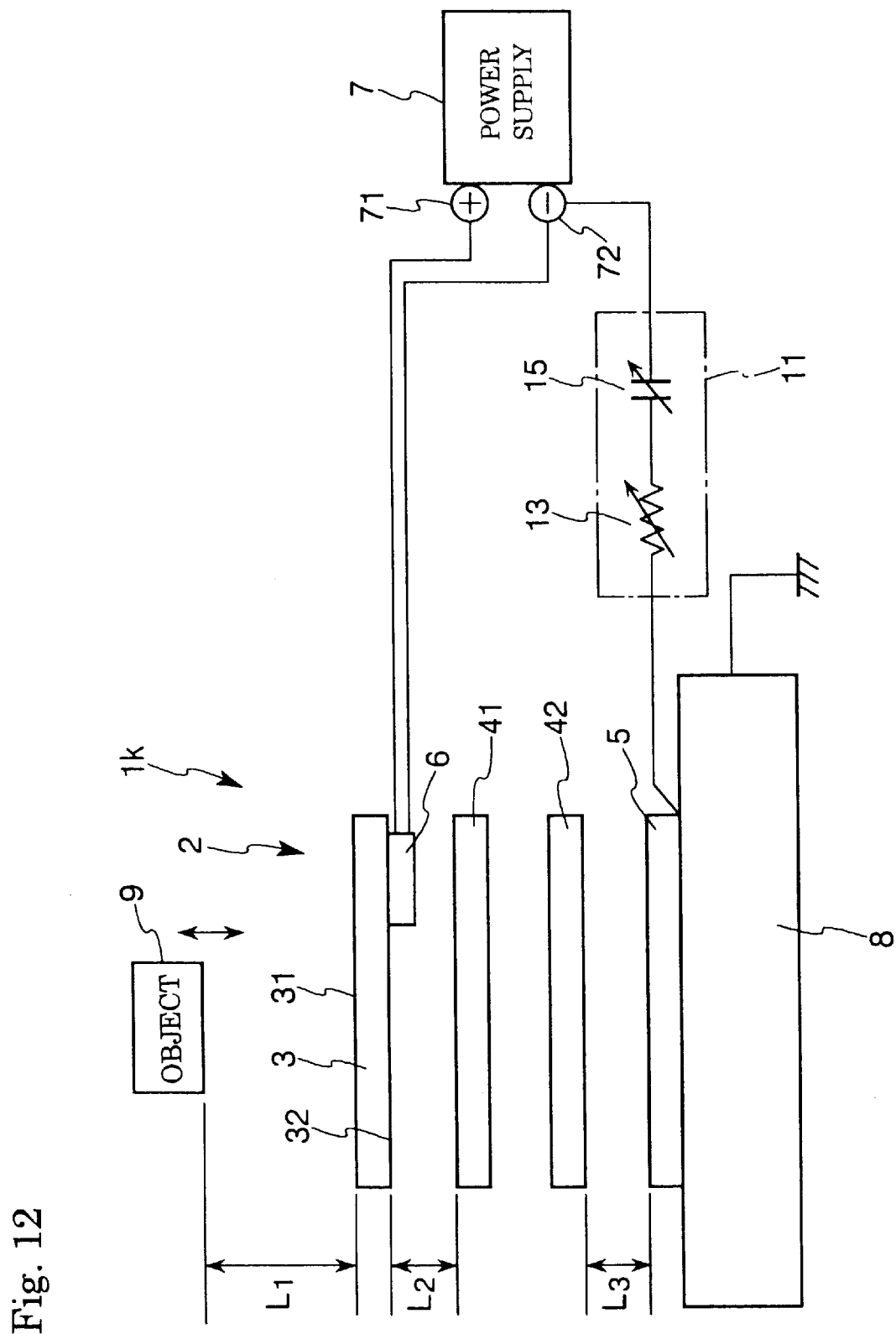

ELECTROSTATIC CAPACITY SENSOR

This application is a continuation of Ser. No. 09/254,467 Apr. 2, 1999 which is a 371 of PCT/J097/03154 Sep. 8, 1997.

FIELD OF THE INVENTION

The present invention relates to an electrostatic capacity sensor.

BACKGROUND OF THE INVENTION

An electrostatic capacity sensor which is capable of detecting approach of an object to be detected has been known. A conventional electrostatic capacity sensor is provided with an electrode part and a detection circuit which is connected to the electrode part. The electrode part is constructed from a detection electrode for detecting approach of an object to be detected (hereinafter, this is also referred to simply as "object") and a ground electrode grounded to a predetermined part.

In such an electrostatic capacity sensor, the capacitance of the detection electrode is increased as the object approaches the detection electrode. In this way, approach of the object is sensed by detecting the change in the capacitance of the detection electrode with the detection circuit.

Practically In reality, however, in the electrostatic capacity sensor, not only the capacitance of the detection electrode, but also the capacitance of the electrode part and the capacitance of the detection circuit and the like are also detected. Moreover, the capacitance varies with the changes in the ambient conditions such as the temperature and humidity, or vibration, which act as noises in the measurement. Because of this, the conventional electrostatic capacity sensor has low detection precision. Besides, the electrostatic capacity sensor is liable to malfunction when the ambient conditions vary. In particular, when the electrostatic capacity sensor is used in outdoors the detection precision is deteriorated further since the temperature and the humidity vary drastically with the season, time of the day, weather, or the like.

Furthermore, in the conventional electrostatic capacity sensor, the sensitivity of the electrode part itself is low and unstable, so that it has been difficult to increase the detection distance from the detection electrode to an object to be detected (hereinafter, ref erred to as "detection distance").

In particular, the variations in the capacitance of the electrode part due to the changes in the ambient conditions become larger in the case where the detection plane of the detection electrode has a large area. As a result, noises are increased, so that the detection precision of the electrostatic capacity sensor is reduced. Further, when the area of the detection plane of the detection electrode is relatively large, the threshold of the detection circuit should be set at a high level in order to improve the detection precision. However, this increases influence of noiser so that it is difficult to set the detection distance at a sufficiently large value.

It is an object of the present invention, irrespective of the size of the detection electrode, to provide an electrostatic capacity sensor with high detection precision and high sensitivity.

In order to achieve the above object, the electrostatic capacity sensor according to the present invention comprises an electrostatic capacity type detection element in which a detection electrode, a ground electrode and a charge plate interposed between the detection electrode and the ground electrode are arranged in a state that they are isolated to each other; a detection circuit for detecting changes in capacitance of the detection electrode caused by an object to be detected; and a power supply for supplying electrical power to the detection circuit.

It is preferable that the ground electrode is electrically connected to a negative terminal of the power supply.

The ground electrode may be electrically connected to a negative terminal of the power supply via a relay circuit. In this case, it is preferable that the relay circuit includes a resistor. Further, it is more preferable that the resister is a variable resister.

Moreover, it is preferable that the relay circuit includes a capacitor. Further, it is more preferable that the capacitor is a variable capacitor. In this case, the relay circuit has a function that adjusts sensitivity of the electrostatic capacity sensor. Further, the relay circuit also has a function that stabilizes sensitivity of the electrostatic capacity sensor.

In the electrostatic capacity sensor according to the present invention, the sensitivity of the electrostatic capacity sensor can be adjusted by adjusting the distance between the charge plate and the ground electrode.

It is preferable that the distance between the charge plate and the ground electrode is set so as to be larger than the distance between the detection electrode and the charge plate.

Moreover, it is also preferable that the detection electrode has a first surface that functions as a detection plane and a second surface which is opposite to the first surface, and the detection circuit is provided on the second surface of the detection electrode.

Further, it is also preferable that a plurality of charge plates are arranged along the direction of the thickness of the detection element.

BRIEF DESCRIPTION OF THE DRAWINGS

FIG. 12 is a schematic side view showing an 11th embodiment of the electrostatic capacity sensor according to the present invention.

PREFERRED EMBODIMENTS OF THE INVENTION

Hereinbelow, an electrostatic capacity sensor according to the present invention will be described in detail based on the preferred embodiments illustrated in the accompanying drawings.

Figure 1:
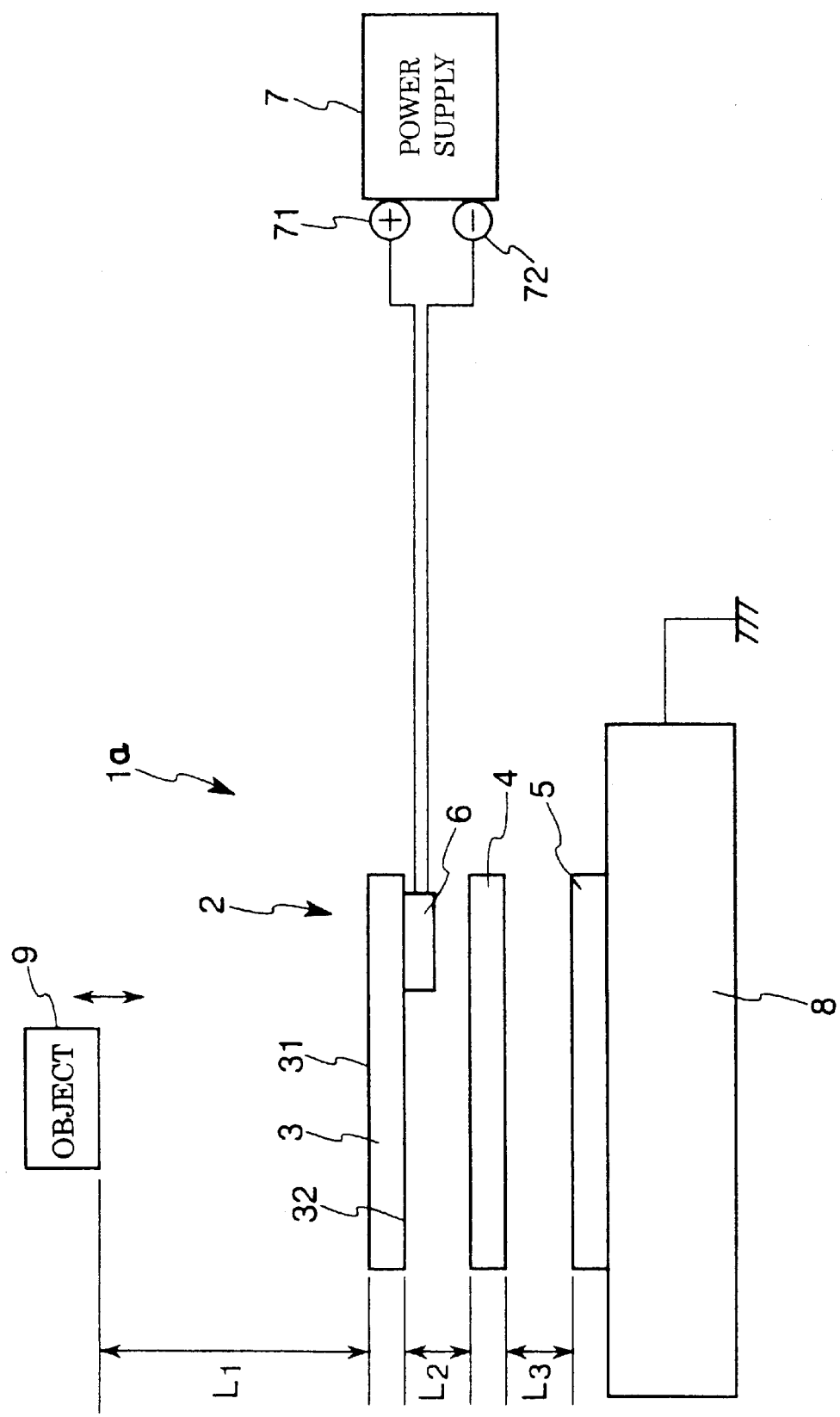
FIG. 1 is a schematic side view showing a first embodiment of an electrostatic capacity sensor according to the present invention.

FIG. 1 is a schematic side view showing a first embodiment of the electrostatic capacity sensor of this invention.

As shown in FIG. 1, an electrostatic capacity sensor 1a includes an electrostatic capacity type detection element (electrode part) 2, a circuit board 6 on which a detector is mounted, and a power supply (DC power supply) 7.

The detection element 2 is mainly composed of a detection electrode 3, a charge plate 4 and a ground electrode 5. The charge plate 4 is positioned between the detection electrode 3 and the ground electrode 5. The detection electrode 3, the charge plate 4 and the ground electrode 5 are structurally arranged such that they are physically isolated from each other. In this case, it is preferable that the detection electrode 3, the charge plate 4 and the ground electrode 5 are arranged parallel to each other.

The detection electrode 3, the charge plate 4 and the ground electrode 5 are supported at their end portions by support members made of an insulating material (not shown in the drawings). In this embodiment, a space is formed between the detection electrode 3 and the charge plate 4, and between the charge plate 4 and the ground electrode 5, respectively.

In this invention, an insulating layer (for example, plate-like insulating member) which mutually isolates the detection electrode 3 and the charge plate 4 may be interposed therebetween. Similarly, an insulating layer may be interposed between the charge plate 4 and the ground electrode 5.

In this embodiment, the detection electrode 3 is formed into a plate shape, but no particular limitation is imposed upon the shape of the detection electrode 3.

For the constituent material of the detection electrode 3, there are no particular limitations. Various kinds of metallic materials or conductive materials can be employed so long as they can function as a detection electrode. Examples of the constituent material for the detection electrode 3 include an aluminum, an aluminum alloy, a copper, a copper alloy, a stainless steel, a conductive film, a conductive rubber, a conductive vinyl chloride and the like.

In this embodiment, the charge plate 4 is formed into a plate shape, but no particular limitation is imposed upon the shape of the charge plate 4.

For the constituent material of the charge plate 4, there are no particular limitations. Various kinds of metallic materials or conductive materials can be employed so long as they can function to store sufficient amount of electric charge as a charge plate. Examples of the constituent material for the charge plate 4 include an aluminum, an aluminum alloy, a copper, a copper alloy, a stainless steel, a conductive film a conductive rubber, a conductive vinyl chloride and the like.

In this embodiment, the ground electrode 5 is formed into a plate shape, but no particular limitation is imposed upon the shape of the ground electrode 5.

For the constituent material for the ground electrode 5, there are no particular limitations. Various kinds of metallic materials or conductive materials can be employed so long as they can function as a ground electrode. Examples of the constituent material for the ground electrode 5 include an aluminum, an aluminum alloy, a copper, a copper alloy, a stainless steel, a conductive film, a conductive rubber, a conductive vinyl chloride and the like.

Further, examples of the constituent material for the insulating material and the insulating layer mentioned above include various kinds of resin materials and the like.

As described in the above, since the detection element 2 of the electrostatic capacity sensor 1a has the charge plate 4, it is considered that a capacitor is formed between the detection electrode 3 and the charge plate 4. This charge plate 4 supplies charge to the detection electrode 3 or absorbs charge from the detection electrode 3 in response to the amount of charge stored in the detection electrode 3 (in other words, the charge plate 4 functions as a charge supply and absorption part for the detection electrode 3). In this way, certain amount of charge can always be quickly replenished and stored, so that the sensitivity of the detection element 2 can be improved and stabilized.

Further, it is considered that serially connected two capacitors are formed between the detection electrode 3 and the charge plate 4 and between the charge plate 4 and the ground electrode 5, respectively. With this result, the capacitance of each capacitor is lowered in comparison with the case when no charge plate is provided. Therefore, noises generated by the variations in the capacitance caused by the changes in the ambient conditions (such as changes in the temperature or humidity and vibration and the like) is reduced. In other words, since the ratio of the signal to noise generated by the changes in the ambient conditions (the ratio of SIN) is increased, the detection precision of the electrostatic capacity sensor 1a is improved.

The circuit board 6 is provided on the plane 32 opposite to the detection plane 31 of the detection electrode 2. In this case, the circuit board 6 is insulated from the charge plate 4.

Since the circuit board 6 is provided on the opposite plane 32 of the detection electrode 3 as described above, it is considered that two capacitors are additionally formed between the circuit board 6 and the detection electrode 3 and between the circuit board 6 and the charge plate 4, respectively. These capacitors are also considered to be a part of a serially connected plurality of capacitors (which are comprised of the capacitors formed between the object 9 and the detection electrode 3, between the detection electrode 3 and the charge plate 4, and between the charge plate 4 and the ground electrode 5, respectively). Accordingly, the circuit board 6 is not likely to be affected by the changes in the ambient conditions, and this means that the detection precision of the electrostatic capacity sensor 1a is not likely to be affected by the changes in the ambient conditions.

Besides, since the circuit board 6 is not provided on the detection plane 31 of the detection electrode 3, it is possible to make the detection surface 31 planar.

The detection circuit provided in the circuit board 6 is connected electrically to a positive terminal 71 and a negative terminal 72 of the power supply 7, and power is supplied from the power supply 7 to the detection circuit. Hereinafter, "electrical connection" will be simply referred to as connection. The detection circuit will be described in more detail later.

Now, in the case where a detection element of an electrostatic capacity sensor includes a detection electrode which has the area of the detection plane of more than 30 cm$^2$, in particular more than 100 cm$^2$, and in more particular more than 300 cm$^2$, it is necessary to further reduce the variations of the capacitance of the detection electrode 3 due to changes in the ambient conditions. However, since the detection element 2 in this invention has the charge plate 4, it is possible to suppress the variations in the capacitance of the detection electrode 3 due to the changes in the ambient conditions as mentioned above.

Hereinafter, the detection distance from the detection plane 31 of the detection electrode 3 to the object 9 is referred to as "L$_1$". The distance between the detection electrode 3 and the charge plate 4 is referred to as "L$_2$". The distance between the charge plate 4 and the ground electrode 5 is referred to as "L$_3$".

In the electrostatic capacity sensor 1a, the sensitivity of the detection element (the sensitivity of the electrostatic capacity sensor 1a) is more improved as the distance L$_3$ is set to be a larger value. As a result, it is possible to increase the detection distance L$_1$. This is due to the following reasons. The capacitance of the capacitor formed by the charge plate 4 and the ground electrode 5 is reduced if the distance L$_3$ is set to be a larger value. Therefore, the discharge of the charge on the charge plate 4 to the ground electrode 5 is suppressed, and the migration of the charge on the charge plate 4 to the detection electrode 3 is facilitated. In this way, a certain amount of charge is stored quickly and surely on the detection electrode 3.

For this reason, the distance L$_3$ between the charge plate 4 and the ground electrode 5 is preferably set to be larger than the distance L$_2$, and more preferably set so as to be larger than twice L$_2$.

Moreover, in the electrostatic capacity sensor 1a, the sensitivity of the detection element 2 (the sensitivity of the electrostatic capacity sensor 1a) can be adjusted by adjusting the distance L$_3$. Further, the detection distance L$_1$ can be also adjusted by adjusting the sensitivity of the detection element 2, as will be described later.

In this case, with the increase in the distance L$_3$, the sensitivity of the detection element 2 is improved. On the other hand, however, the detection precision of the electrostatic capacity sensor 1a deteriorates. Therefore, it is necessary that the distance L$_3$ should be appropriately determined by taking this fact into consideration.

Furthermore, in order to realize an electrostatic capacity sensor of the reduced size having the equivalent performance with those of the electrostatic capacity sensors described above, it is preferred that each of the detection electrode 3, the charge plate 4 and the ground electrode 5 is formed so as to have substantially the same area.

In providing the electrostatic capacity sensor 1a, the ground electrode 5 is fixed at a predetermined position of the attaching part 8. In this case, the ground electrode 5 is grounded to the attaching part 8 or directly to the earth, or grounded to the earth via the attaching part 8.

Figure 2:
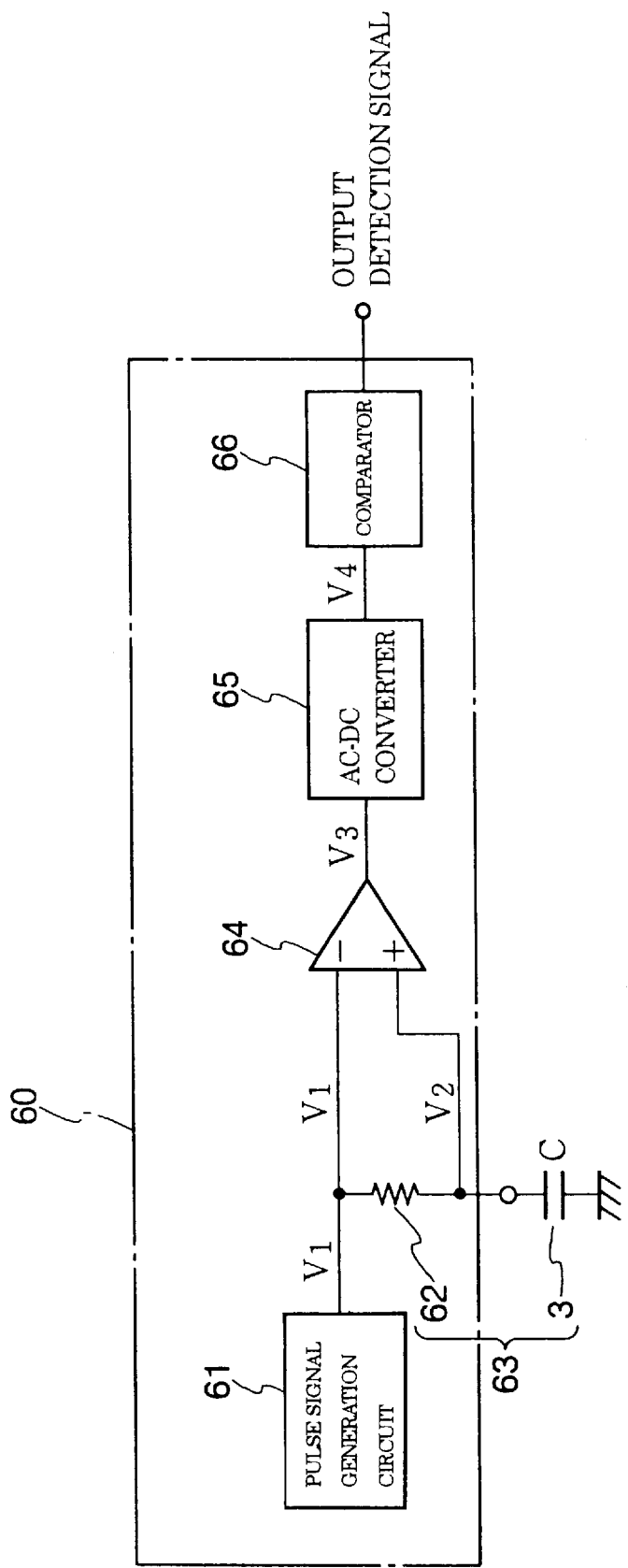
FIG. 2 is a block diagram showing an example of configuration of the detection circuit of the electrostatic capacity sensor according to the present invention.

Next, the detection circuit of the electrostatic capacity sensor 1a will be described. FIG. 2 is a block diagram showing an example of configuration of the detection circuit 1a of the electrostatic capacity sensor 1a.

As shown in FIG. 2, a detection circuit 60 generally includes a pulse signal generation circuit 61, a resistor 62, a differential amplifier 64, an AC–DC converter 65 which converts an AC voltage to a DC voltage, and a comparator 66.

The pulse generation circuit 61, the resistor 62, the differential amplifier 64, the AC–DC converter 65 and the comparator 66 are connected in this order.

The detection electrode 3 is connected to one end of the resistor 62. The resistor 62 and the detection electrode 3 (detection element 2) form an attenuator 63.

The pulse signal generating circuit 61 outputs a pulse signal with voltage V$_1$. This pulse signal from the pulse signal generating circuit 61 is inputted to the attenuator 63 and the negative terminal of the differential amplifier 64, respectively. The capacitance C of the detection electrode 3 (in other words, capacitance of the detection element 2) is increased as the object approaches the detection plane 31 of the detection electrode 3. On the other hand, The capacitance C is decreased as the object moves away from the detection plane 31 of the detection electrode 3.

Further, in response to the capacitance C of the detection electrode 3, the output signal from the pulse signal generation circuit 61 is attenuated by the attenuator 63. The attenuated output signal from the attenuator 63 is inputted to the positive terminal of the differential amplifier 64. In this case, the attenuator 63 outputs the signal with voltage V$_2$ ("voltage V$_2$" is potential difference of the earth and the detection electrode 3).

The differential amplifier 64 amplifies the difference between the voltages V$_1$ and V$_2$, and outputs a signal with voltage V$_3$. This output signal from the differential amplifier 64 is inputted to the AC–DC converter 65 where it is converted from an AC voltage into a DC voltage. The AC–DC converter 65 outputs the signal with voltage V$_4$.

The output signal is inputted into the comparator 66 to be compared with a predetermined threshold (reference voltage) set in advance. When the voltage V$_4$ is greater than the threshold, a high-level signal (H) is outputted from the comparator 66. On the other hand, when the voltage V$_4$ is smaller than the threshold, a low-level signal (L) is outputted from the comparator 66.

As the object 9 approaches the detection plane 31 of the detection electrode 3, the capacitance C of the detection circuit 3 is increased. This causes the voltage V$_2$ of the output signal from the attenuator 63 to be decreased. Further, as the voltage V$_2$ is decreased, the voltage V$_3$ of the output signal from the differential amplifier 64 is increased. This causes the voltage V$_4$ of the output signal from the AC–DC converter 65 to be increased. Accordingly, a low level signal (L) is outputted from the detection circuit 60 until the voltage V$_4$ becomes equal to the threshold. Then, when the voltage V$_4$ exceeds the threshold, a high-level signal (H) is output from the detection circuit 60. Therefore, this detection signal can be utilized for detecting the approach of the object 9.

In this electrostatic capacity sensor 1a, the detection distance L$_1$ is determined depend upon the combination of the sensitivity of the detection element 2 and the threshold. In this case, it is preferred that the adjustment of the detection distance L$_1$ is carried out by adjusting the sensitivity of the detection element 2 appropriately under the state that the threshold is being set at a predetermined level. This is due to the following reasons.

In order to make the threshold variable, it is necessary for the comparator 66 to have a variable resistor for adjusting the threshold. However, since the variable resistor has a relatively large capacitance, the variations in the capacitance of the variable resistor due to the changes in the ambient conditions are liable to appear as noises. These noises give adverse effects to the detection of the capacitance of the detection electrode 3 in some cases. On the other hand, however, in the case where the threshold is set to be a predetermined value, the variable resister can be eliminated from the comparator 66. With this result, it is possible to suppress the generation of such noises, so that the detection precision of the electrostatic capacity sensor 1a can be improved.

As described in the above, according to this electrostatic capacity sensor 1a, since the detection element 2 has the charge plate 4, it is possible to improve the sensitivity of the detection element 2, thereby increasing the detection distance $L_1$. In addition, the variations in the capacitance of the detection element 2 due to the changes in the ambient conditions can be reduced. As a result, the ratio of the signal to noise (the ratio of S/N) is increased, so that the detection precision of the electrostatic capacity sensor 1a is improved.

Next, a second embodiment of the electrostatic capacity sensor according to the present invention will be described.

Figure 3:
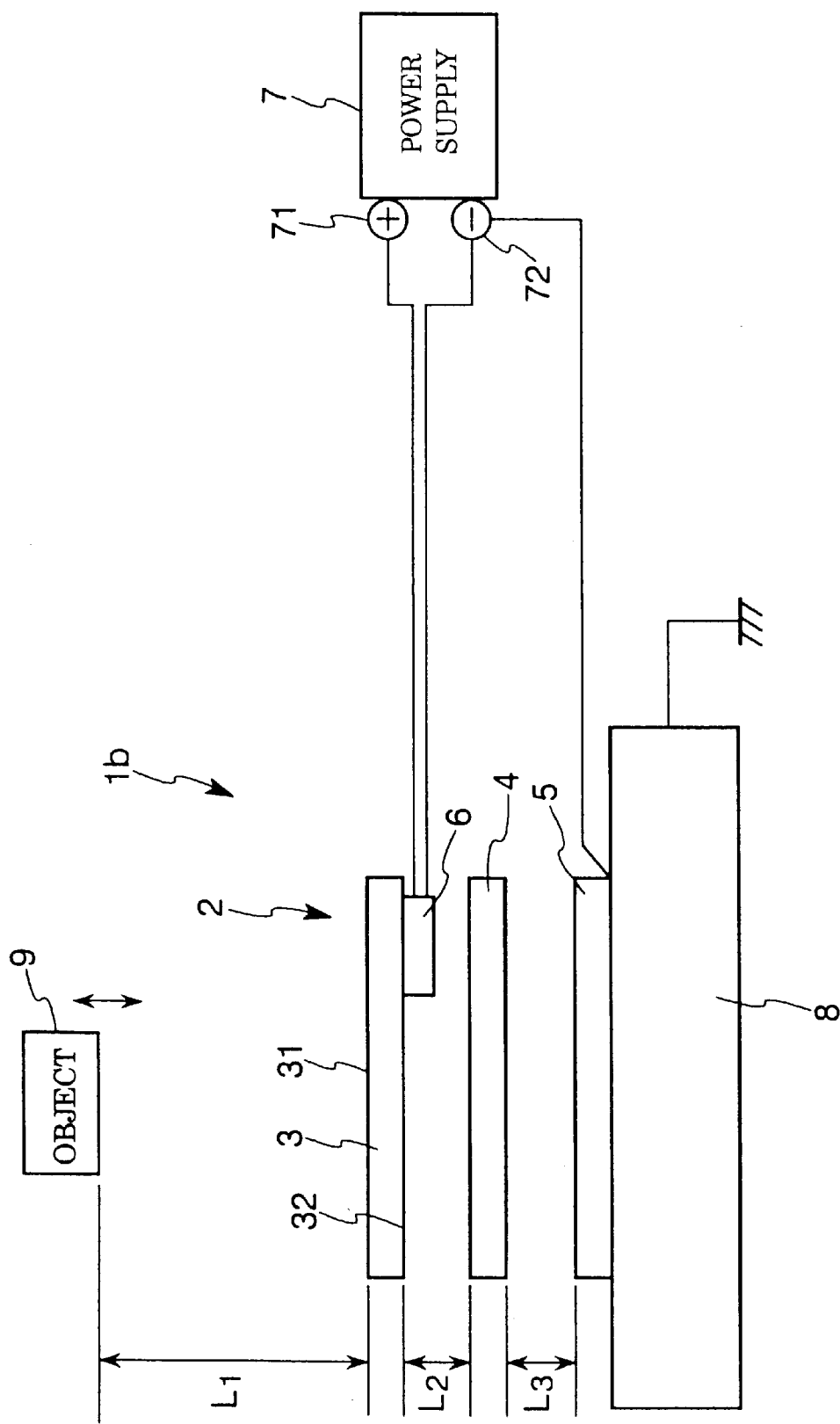
FIG. 3 is a schematic side view showing a second embodiment of the electrostatic capacity sensor according to the present invention.

FIG. 3 is a schematic side view showing the second embodiment of the electrostatic capacity sensor of this invention. In the following, the structures and elements of this embodiment which are In common with those of the above-mentioned electrostatic capacity sensor 1a will be omitted, and only the principal differences therebetween will be described.

As shown in FIG. 3, in an electrostatic capacity sensor 1b, the ground electrode 5 is connected to the negative terminal 72 of the power supply 7. The remaining construction of the electrostatic capacity sensor 1b is almost the same as in the electrostatic capacity sensor 1a of the first embodiment described above.

In this electrostatic capacity sensor 1b, it is possible to discharge the charge more effectively from the ground electrode 5 than in the case where the ground electrode 5 is not connected to the negative terminal 72 of the power supply 7. In this way, the sensitivity of the detection element 2 is improved. In addition, the ground electrode 5 becomes substantially free from the influence of charges existing in the atmosphere and the influence of the capacitance existing between the earth and the ground electrode (for example, the capacitance in and around the attaching table 8). Therefore, the noise due to variations of the capacitance is reduced, so that the detection precision of the sensor 1b is improved.

Moreover, according to the electrostatic capacity sensor 1b, the detection element 2 has the charge plate 4 in the same manner as the above-mentioned electrostatic capacity sensor 1a. Therefore, the sensitivity of the detection element 2 can be improved, so that the detection distance $L_1$ can be increased. In addition, the variations in the capacitance of the detection element 2 due to the changes in the ambient conditions are reduced. In this way, the ratio of S/N is increased, thereby enabling to improve the detection precision of the electrostatic capacity sensor 1b.

Next, a third embodiment of the electrostatic capacity sensor according to the present invention will be described.

Figure 4:
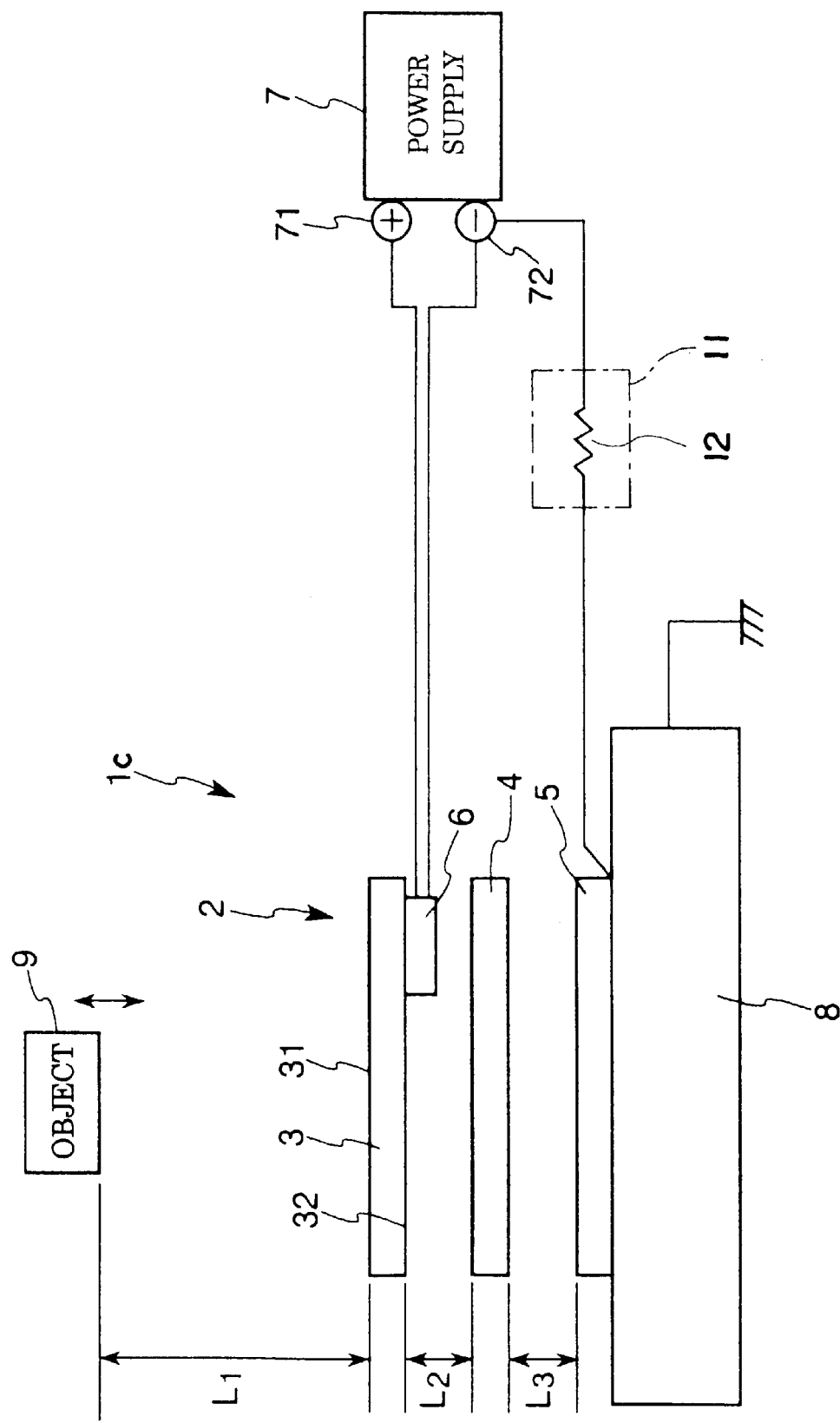
FIG. 4 is a schematic side view showing a third embodiment of the electrostatic capacity sensor according to the present invention.

FIG. 4 is a schematic side view showing the third embodiment of the electrostatic capacity sensor 1c of this invention. In the following, the structures and elements of this embodiment which are in common with those of the above-mentioned electrostatic capacity sensor 1b are omitted, and only the principal differences therebetween will be described.

As shown in FIG. 4, in an electrostatic capacity sensor 1c, the ground electrode 5 is connected to the negative terminal 72 of the power supply 7 via a relay circuit 11. It is preferable that the relay circuit 11 is arranged apart from the detection element 2 by a predetermined distance so that its capacitance does not give any influence to the detection circuit 60. The remaining construction of the electrostatic capacity sensor 1c is almost the same as in the electrostatic capacity sensor 1b of the second embodiment described above.

The relay circuit 11 of the electrostatic capacity sensor 1c has a resistor 12.

By providing the resistor 12 between the ground electrode 5 and the negative terminal 72, it is possible to make the sensitivity of the ground electrode 5 to be sufficiently small in comparison with the sensitivity of the detection electrode 3. This means that it becomes possible to prevent the ground electrode 5 from functioning as a detection electrode. In this way, the sensitivity of the detection electrode 2 is stabilized, thereby enabling to improve the detection precision of the electrostatic capacity sensor 1c.

In the electrostatic capacity sensor 1c, with the increase in the resistance of the resistor 12, the sensitivity of the detection element 2 is stabilized. On the other hand, however, the sensitivity of the detection element 2 is deteriorated. Therefore, the resistance of the resistor 12 should be appropriately determined by taking this fact into consideration.

According to the electrostatic capacity sensor 1c, the detection element 2 has the charge plate 4 in the same manner as the electrostatic capacity sensor 1b of the second embodiment described above. Therefore, the sensitivity of the detection element 2 can be improved, so that it is possible to increase the detection distance $L_1$. In addition, the variations in the capacitance of the detection element due to the changes in the ambient conditions are reduced. In this way, the ratio of S/N is increased, thereby enabling to improve the detection precision of the electrostatic capacity sensor 1c.

Next, a fourth embodiment of the electrostatic capacity sensor of according to the present invention will be described.

Figure 5:
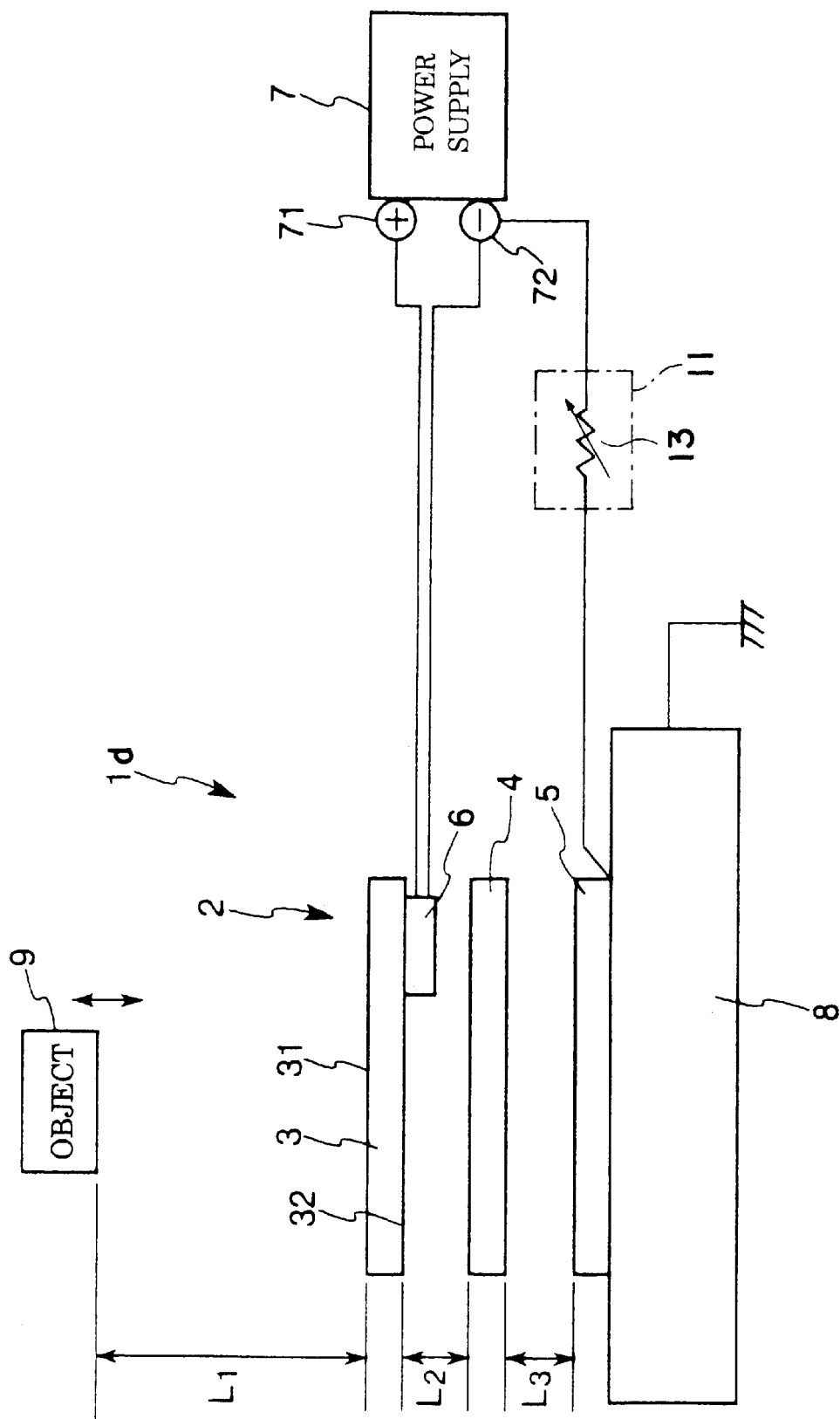
FIG. 5 is a schematic side view showing a fourth embodiment of the electrostatic capacity sensor according to the present invention.

FIG. 5 is a schematic side view showing the fourth embodiment of the electrostatic capacity sensor 1d of this invention. In the following, the structures and elements of this embodiment which are in common with those of the above-mentioned electrostatic capacity sensor 1c are omitted, and only the principal differences therebetween will be described.

As shown in FIG. 5, in an electrostatic capacity sensor 1d, the relay circuit 11 includes a variable resistor 13. The remaining construction of the electrostatic capacity sensor 1d is almost the same as in the electrostatic capacity sensor 1c of the third embodiment described above.

In the electrostatic capacity sensor 1d, since the variable resistor 13 is used, it is possible to adjust the sensitivity of the detection element 2 and the stability of the sensitivity easily by adjusting the resistance of the variable resistor 13 such that the optimum sensitivity and stability can be obtained.

Moreover, according to the electrostatic capacity sensor 1d, the detection element 2 has the charge plate 4 in the same manner as the electrostatic capacity sensor 1c of the third embodiment described above. Therefore, the sensitivity of the detection element 2 can be improved, thereby enabling to increase the detection distance $L_1$. In addition, the variations in the capacitance of the detection element 2 due to the changes in the ambient conditions are reduced. In this way, the ratio of S/N is increased, so that it is possible to improve the detection precision of the electrostatic capacity sensor 1d.

Next, a fifth embodiment of the electrostatic capacity sensor according to the present invention will be described.

Figure 6:
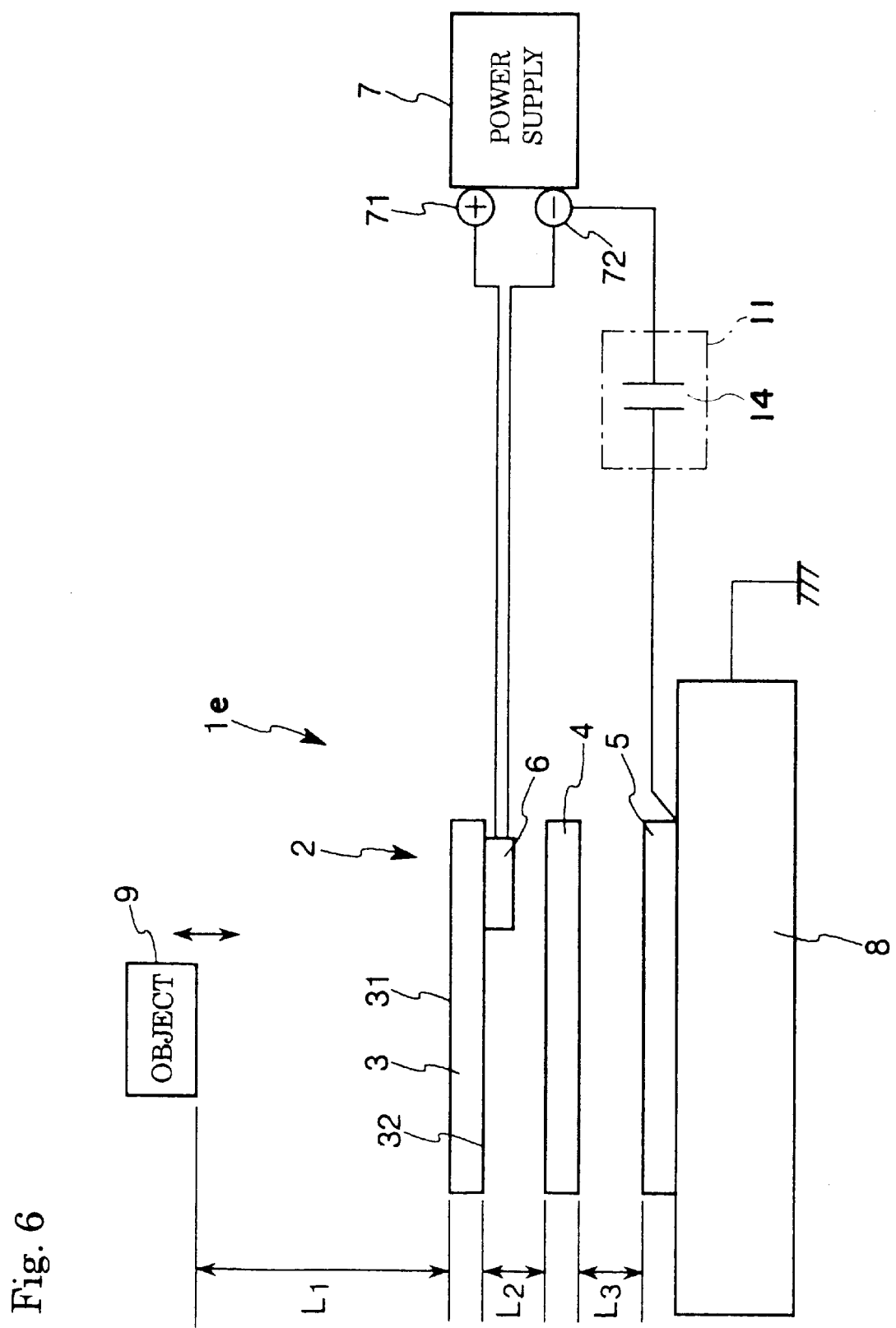
FIG. 6 is a schematic side view showing a fifth embodiment of the electrostatic capacity sensor according to the present invention.

FIG. 6 is a schematic side view showing the fifth embodiment of the electrostatic capacity sensor 1e of this invention. In the following, the structures and elements of this embodiment which are in common with those of the above-mentioned electrostatic capacity sensor 1c are omitted, and only the principal differences therebetween will be described.

As shown in FIG. 6, in an electrostatic capacity sensor 1e, the relay circuit 11 includes a capacitor 14, and the remaining construction of the sensor 1e is almost the same as in the electrostatic capacity sensor 1c of the third embodiment described above.

By providing a capacitor 14 between the ground electrode 5 and the negative terminal 72 of the power supply 7, the sensitivity of the detection element 2 is improved.

In particular, it is possible to improve the sensitivity of the detection element 2 while keeping the distance $L_3$ constant, that is, without making the distance $L_3$ large. This is advantageous in reducing the thickness of the electrostatic capacity sensor 1e (the thickness of detection element 2).

In the electrostatic capacity sensor 1e, the adjustment of the sensitivity of the detection element 2 is achieved by adjusting the capacitance of the capacitor 14. In this case, as mentioned above, it is preferable that the setting of the detection distance $L_1$ is carried out by the adjustment of the sensitivity of the detection element 2.

In this case, with the increase in the capacitance of the capacitor 14, the sensitivity of the detection element 2 is improved. On the other hand, however, the detection precision of the electrostatic capacity sensor 1e is deteriorated. Therefore, the capacitance of the capacitor 14 should be determined appropriately by taking this fact into consideration.

According to the electrostatic capacity sensor 1e, the detection element 2 has the charge plate 4 in the same manner as the electrostatic capacity sensor 1c of the third embodiment described above. Therefore, the sensitivity of the detection element 2 can be improved, so that it is possible to increase the detection distance $L_1$. In addition, the variations in the capacitance of the detection element 2 due to the changes in the ambient conditions are reduced in this way, the ratio of SIN is increased, thereby enabling to improve the detection precision of the electrostatic capacity sensor 1e.

Next, a sixth embodiment of the electrostatic capacity sensor according to the present invention will be described.

Figure 7:
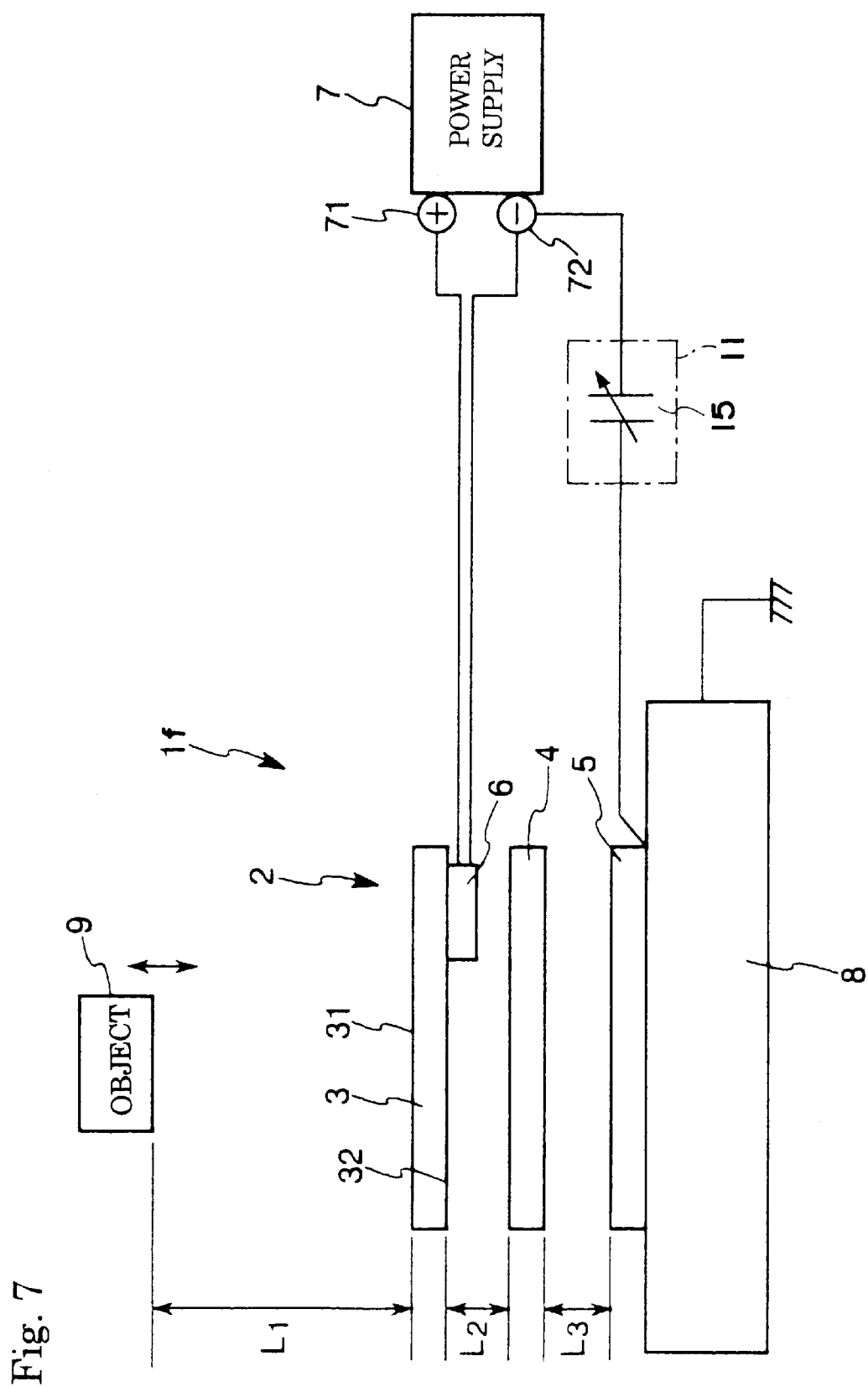
FIG. 7 is a schematic side view showing a sixth embodiment of the electrostatic capacity sensor according to the present invention.

FIG. 7 is a schematic side view showing the sixth embodiment of the electrostatic capacity sensor of this invention. In the following, the structures and elements of this embodiment which are In common with those of the above-mentioned electrostatic capacity sensor 1e are omitted, and only the principal differences therebetween will be described.

As shown in FIG. 7, in an electrostatic capacity sensor 1f, the relay circuit 11 includes a variable capacitor 15, and the remaining construction of the electrostatic capacity sensor if is almost the same as in the electrostatic capacity sensor 1e of the fifth embodiment described above.

In the electrostatic capacity sensor 1f, since the variable capacitor 15 is used, it is possible to adjust the sensitivity of the detection element 2, that is, the detection distance $L_1$ readily by adjusting the capacitance of the variable capacitor 15.

Moreover, according to the electrostatic capacity sensor 1f, the detection element 2 has the charge plate 4 in the same manner as the above-mentioned electrostatic capacity sensor 1e. Therefore, the sensitivity of the detection element 2 can be improved, so that it is possible to increase the detection distance $L_1$. In addition, the variations in the capacitance of the detection element 2 due to the changes in the ambient conditions are reduced. In this way, the ratio of SIN is increased, thereby enabling to improve the detection precision of the electrostatic capacity sensor 1f. Further, this is advantageous in reducing the thickness of the electrostatic capacity sensor.

Next, a seventh embodiment of the electrostatic capacity sensor according to the present invention will be described.

Figure 8:
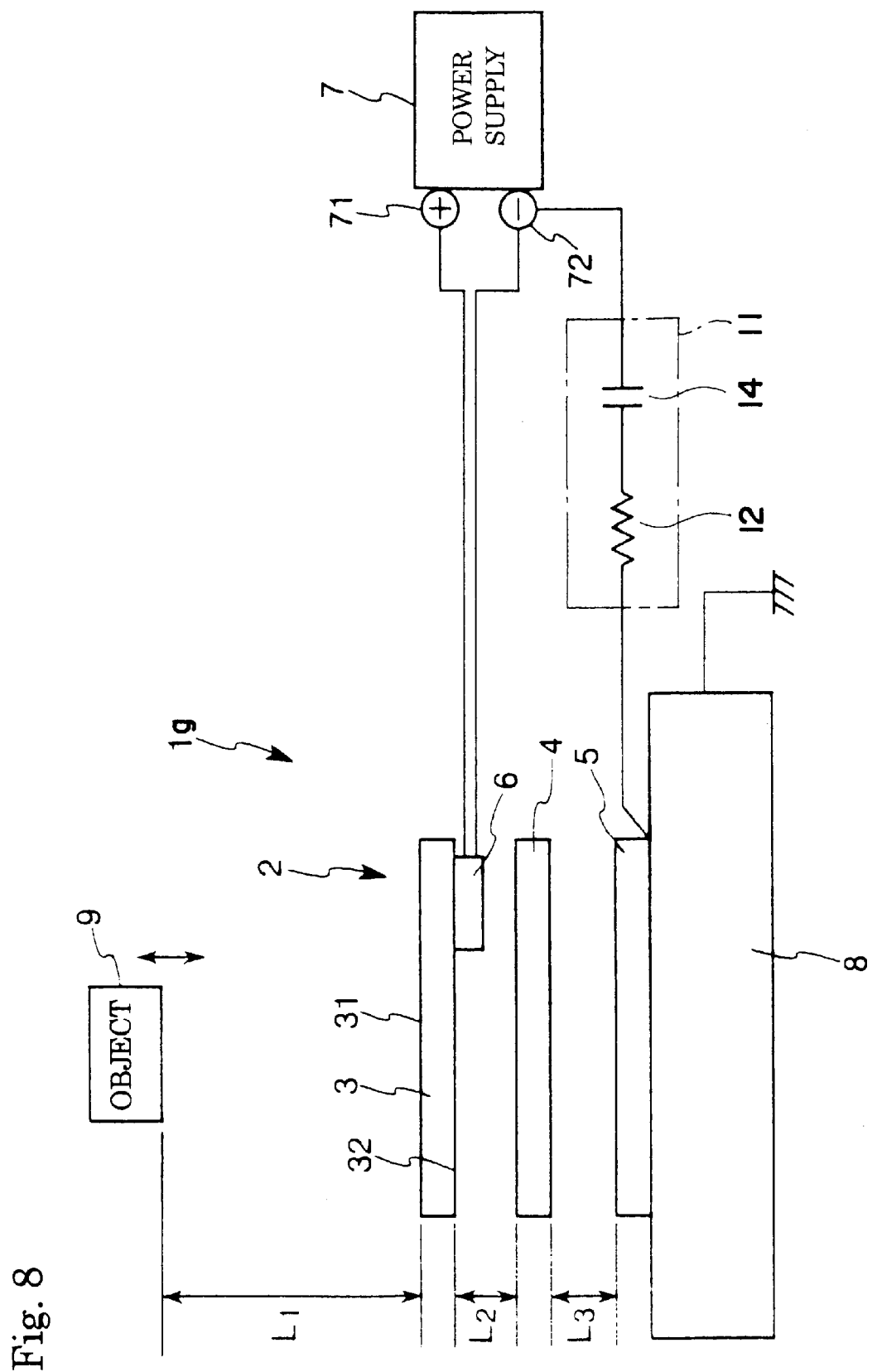
FIG. 8 is a schematic side view showing a seventh embodiment of the electrostatic capacity sensor according to the present invention.

FIG. 8 is a schematic side view showing the seventh embodiment of the electrostatic capacity sensor of this invention. In the following, the structures and elements of this embodiment which are in common with those of the above-mentioned electrostatic capacity sensor 1f are omitted, and only the principal differences therebetween will be described.

As shown in FIG. 8, in an electrostatic capacity sensor 1g, the relay circuit 11 includes a resistor 12 and a capacitor 14 that are connected in series. The remaining construction of the electrostatic capacity sensor 1g is almost the same as in the electrostatic capacity sensor 1e of the fifth embodiment described above.

In the electrostatic capacity sensor 1g, in the same manner as the above-mentioned electrostatic capacity sensor 1e, the sensitivity of the detection element 2 is improved by the provision of the capacitor 14.

Moreover, in the same manner as the above-mentioned electrostatic capacity sensor 1c, the sensitivity of the ground electrode 5 is made sufficiently small compared with the sensitivity of the detection electrode 3 by the provision of the resistor 12, thereby enabling to prevent the ground electrode 5 from functioning as a detection electrode. In this way, the sensitivity of the detection element 2 is stabilized, and the detection precision of the electrostatic capacity sensor 1g is improved.

Furthermore, according to the electrostatic capacity sensor 1g, in the same manner as the above-mentioned electrostatic capacity sensor 1e, the detection element 2 has the charge plate 4. Therefore, the sensitivity of the detection element 2 can be improved, so that it is possible to increase the detection distance $L_1$. In addition, the variations in the capacitance of the detection element 2 due to the changes in the ambient conditions are reduced. In this way, the ratio of SIN is increased, thereby enabling to improve the detection precision of the electrostatic capacity sensor 1g. Further, this is also advantageous in reducing the thickness of the electrostatic capacity sensor 1g.

Next, an eighth embodiment of the electrostatic capacity sensor according to the present invention will be described.

Figure 9:
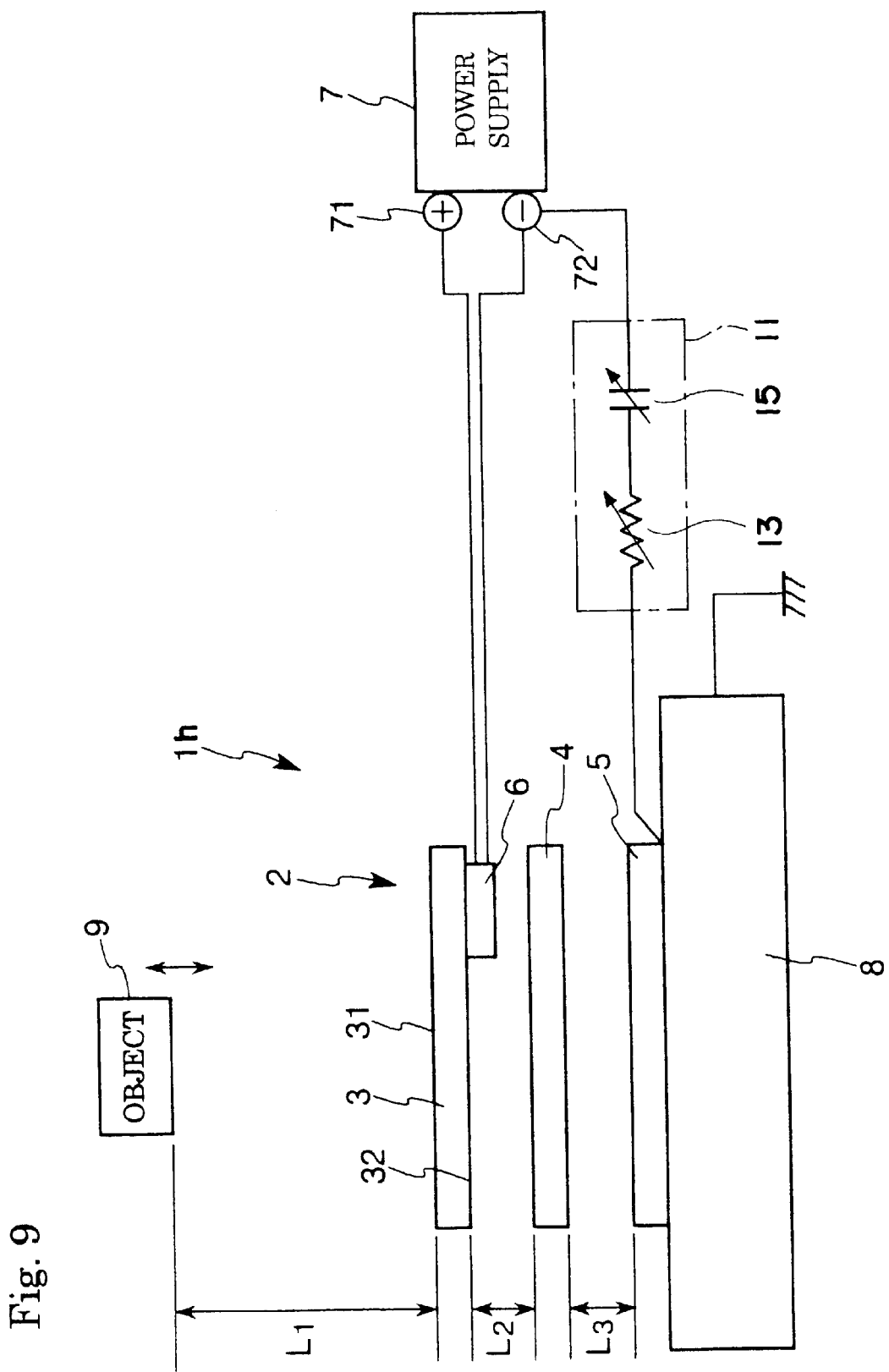
FIG. 9 is a schematic side view showing an eighth embodiment of the electrostatic capacity sensor according to the present invention.

FIG. 9 is a schematic side view showing the eighth embodiment of the electrostatic capacity sensor of this invention. In the following, the structures and elements of this embodiment which are in common with those of the above-mentioned electrostatic capacity sensor 1g are omitted, and only the principal differences therebetween will be described.

As shown in FIG. 9, in an electrostatic capacity sensor 1h, the relay circuit 11 includes the variable resistor 13 and the variable capacitor 15 which are connected in series. The remaining construction of the electrostatic capacity sensor 1h is almost the same as in the electrostatic capacity sensor 1g of the seventh embodiment described above.

In this electrostatic capacity sensor 1h, since the variable resistor 13 is used, it is possible to adjust the sensitivity of the detection element 2 and the stability of the sensitivity easily by adjusting the resistance of the variable resistor 13 such that the optimum sensitivity and the stability can be obtained. Further, since the variable capacitor 15 is also used, it is possible to adjust the sensitivity of the detection element 2, that is, the detection distance $L_1$ readily by adjusting the capacitance of the variable capacitor 15.

Moreover, according to the electrostatic capacity sensor 1h, in the same manner as the above-mentioned electrostatic capacity sensor 1g, the detection element 2 has the charge plate 4. Therefore, the sensitivity of the detection element 2 can be improved, so that it is possible to increase the detection distance $L_1$. In addition, the variations in the capacitance of the detection element 2 due to the changes in the ambient conditions are reduced. In this way, the ratio of SIN is increased, thereby enabling to improve the detection precision of the electrostatic capacity sensor 1h. Further, this is also advantageous in reducing the thickness of the electrostatic capacity sensor 1h.

Next, a ninth embodiment of the electrostatic capacity sensor according to the present invention will be described.

Figure 10:
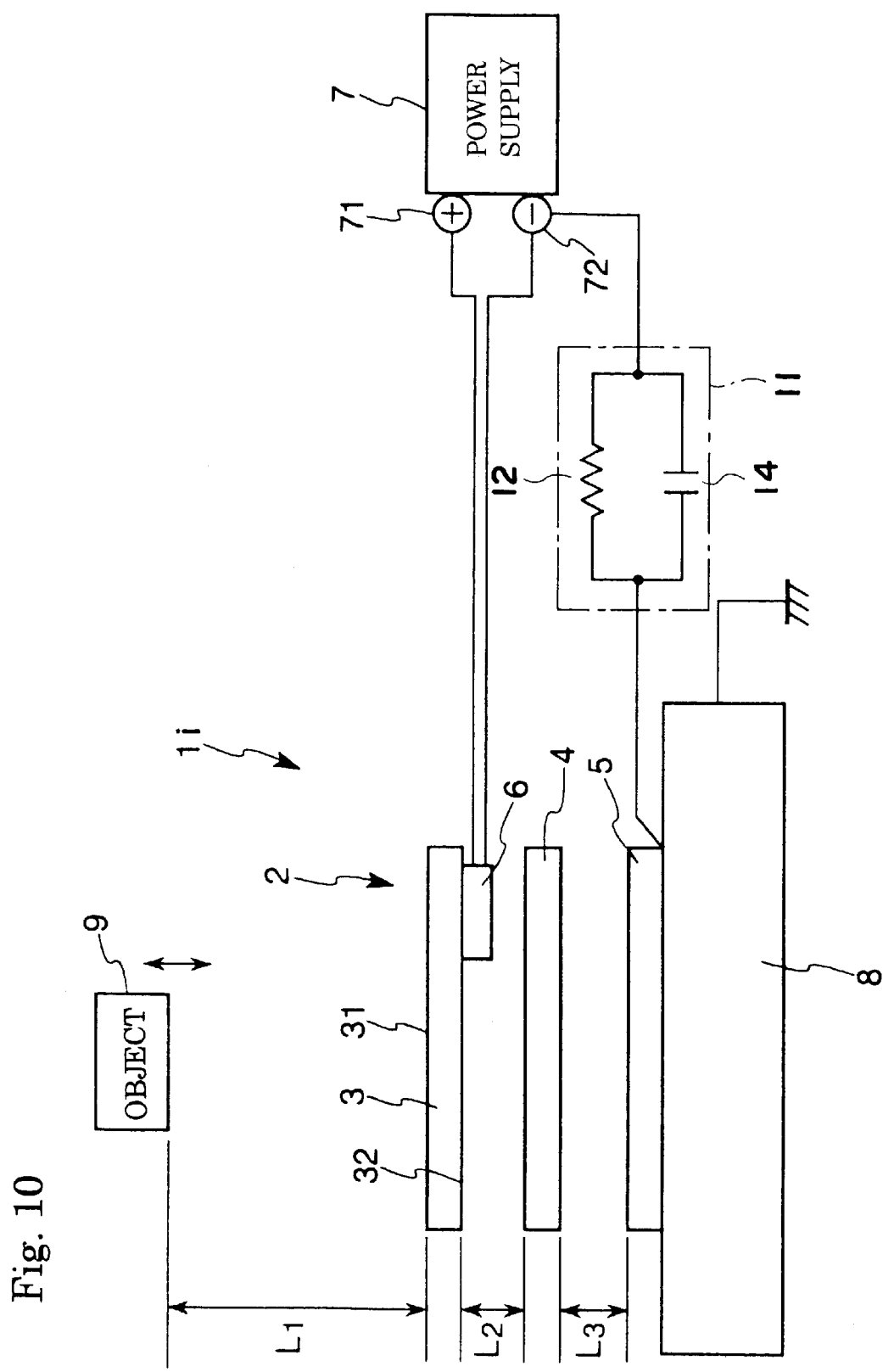
FIG. 10 is a schematic side view showing a ninth embodiment of the electrostatic capacity sensor according to the present invention.

FIG. 10 is a schematic side view showing the ninth embodiment of the electrostatic capacity sensor of this invention. In the following, the structures and elements of this embodiment which are in common with those of the above-mentioned electrostatic capacity sensor 1g are omitted, and only the principal differences therebetween will be described.

As shown in FIG. 10, in an electrostatic capacity sensor 1i, the relay circuit 11 includes the resistor 12 and the capacitor 14 which are connected in parallel. The remaining construction of the electrostatic capacity sensor 1i is almost the same as in the electrostatic capacity sensor 1g of the seventh embodiment described above.

In the electrostatic capacity sensor 1i, since the capacitor 14 is used in the same manner as the above-mentioned electrostatic capacity sensor 1g, the sensitivity of the detection element 2 is improved.

Further, the sensitivity of the ground electrode 5 is made sufficiently small compared with the sensitivity of the detection electrode 3 by the provision of the resistor 12. Therefore, it is possible to prevent the ground electrode 5 from functioning as a detection electrode. In this way, the sensitivity of the detection element 2 is stabilized, thereby enabling to improve the detection precision of the electrostatic capacity sensor 1i.

Furthermore, according to the electrostatic capacity sensor 1i, the detection element 2 has the charge plate 4 has in the same manner as the above-mentioned electrostatic capacity sensor 1h. Therefore, the sensitivity of the detection element 2 can be improved, so that it is possible to increase the detection distance $L_1$. In addition, the variations in the capacitance of the detection element 2 are reduced. In this way, the ratio of S/N is increased, thereby enabling to improve the detection precision of the electrostatic capacity sensor 1i. Further, this is also advantageous in reducing the thickness of the electrostatic capacity sensor 1i.

Next, a 10th embodiment of the electrostatic capacity sensor according to the present invention will be described.

Figure 11:
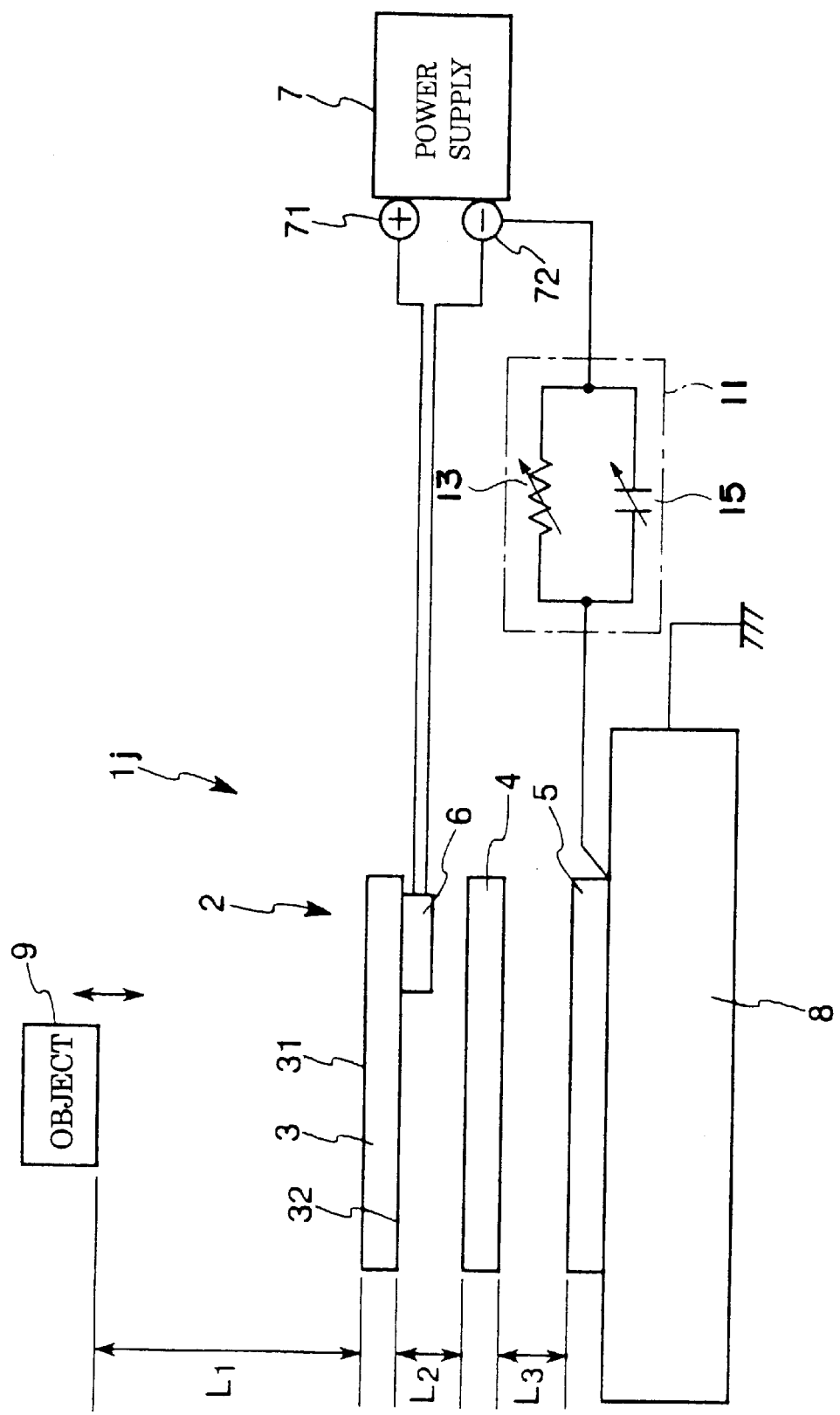
FIG. 11 is a schematic side view showing a 10th embodiment of the electrostatic capacity sensor according to the present invention.

FIG. 11 is a schematic side view of the 10th embodiment of the electrostatic capacity sensor of this invention. In the following, the structures and elements of this embodiment which are in common with those of the above-mentioned electrostatic capacity sensor 1h are omitted, and only the principal differences therebetween will be described.

As shown in FIG. 11, in an electrostatic capacity sensor 1j, the relay circuit 11 includes the variable resistor 13 and the variable capacitor 15 that are connected in parallel. The remaining construction of the sensor 1j is almost the same as in the electrostatic capacity sensor 1h of the eighth embodiment described above.

In this electrostatic capacity sensor 1j, since the variable resistor 13 is used, it is possible to adjust the sensitivity of the detection element 2 and the stability of the sensitivity easily by adjusting the resistance of the variable resistor 13 such that the optimum sensitivity and stability can be obtained. Further, since the variable capacitor 15 is also used, it is possible to adjust the sensitivity of the detection element 2, that is, the detection distance $L_1$ readily by adjusting the capacitance of the variable capacitor 15.

Moreover, according to the electrostatic capacity sensor 1j, the detection element 2 has the charge plate 4 in the same manner as the above-mentioned electrostatic capacity sensor 1h. Therefore, the sensitivity of the detection element 2 can be improved, so that it is possible to increase the detection distance $L_1$. In addition, the variations in the capacitance of the detection element 2 due to the changes in the ambient conditions are reduced. In this way, the ratio of S/N is increased, thereby enabling to improve the detection precision of the electrostatic capacity sensor 1j. Further, this is also advantageous in reducing the thickness of the electrostatic capacity sensor 1j.

Next, an 11th embodiment of the electrostatic capacity sensor according to the present invention will be described.

FIG. 12 is a schematic side view of the 11th embodiment of the electrostatic capacity sensor of this invention. In the following, the structures and elements of this embodiment which are in common with those of the above-mentioned electrostatic capacity sensor 1h are omitted, and only the principal differences therebetween will be described.

As shown in FIG. 12, an electrostatic capacity sensor 1k is different from the above-mentioned electrostatic capacity sensor 1h in the structure of the detection element 2. The remaining construction of the electrostatic capacity sensor 1h is almost the same as in the sensor 1g of the seventh embodiment described above.

The detection element 2 of the electrostatic capacity sensor 1k includes two charge plates constructed from a first charge plate 41 and a second charge plate 42, the detection electrode 3, and the ground electrode 5. In this case, the charge plates 41 and 42 are arranged in the direction of the thickness of the detection element 2 (in the vertical direction of FIG. 12) so as to have the charge plate 41 closer to the detection electrode 3 and the charge plate 42 closer to the ground electrode 5.

In this embodiment, hereinafter, the distance between the detection electrode 3 and the charge plate 41 is referred to as "distance $L_2$", and the distance between the charge plate 42 and the ground electrode 5 is referred to as "distance $L_3$".

In the electrostatic capacity sensor 1k, the detection electrode 3 and the charge plate 41 form a first capacitor. The first charge plate 41 and the second charge plate 42 form a second capacitor. The second charge plate 42 and the ground electrode 5 form a third capacitor. Accordingly, the electrostatic capacity sensor 1k has larger number of serially connected capacitors than in the case of the electrostatic capacity sensor 1h. Therefore, in comparison with the electrostatic capacity sensor 1h, the sensitivity of the detection element 2 is further improved, so that it is possible to increase the detection distance $L_1$ further. In addition, it is possible to reduce noises due to the changes in the ambient conditions, thereby enabling to improve the detection precision of the electrostatic capacity sensor 1k further.

Moreover, in this electrostatic capacity sensor $1k$, since the variable resistor 13 is used in the same manner as the above-mentioned electrostatic capacity sensor $1h$, it is possible to adjust the sensitivity of the detection element 2 and the stability of the sensitivity easily by adjusting the resistance of the variable resistor 13 such that the optimum sensitivity and stability can be obtained. Further, since the variable capacitor 15 is also used, it is possible to adjust the sensitivity of the detection element 2, that is, the detection distance $L_1$ readily by adjusting the capacitance of the variable capacitor 15. Furthermore, the sensitivity of the detection element 2 can be improved while fixing the distance $L_3$, and this is advantageous in reducing the thickness of the electrostatic capacity sensor $1k$.

In this invention, the electrostatic capacity sensor may include three charge plates or more.

In this invention, with the increase of the number of the charge plates, the number of the serially connected capacitors is also increased. Therefore, from the viewpoint of improving the detection precision, it is preferable that the electrostatic capacity sensor has a larger number of the charge plates. On the other hand, however, with the increase of the number of the charge plates, the thickness of the electrostatic capacity sensor (the vertical length in FIG. 12) is increased.

Under these circumstances, it is preferable that the number of the charge plates is about 2 to 10, and more preferably about 2 to 5.

Moreover, similar to the electrostatic capacity sensor $1k$, it is preferable that the electrostatic capacity sensors $1a$ to $1g$ and $1i$ and $1j$ also include a plurality of the charge plates The use of the electrostatic capacity sensor is not particularly limited. For example, the electrostatic capacity sensor of the present invention may be applied for various kinds of sensors such as a proximity switch (non contact switch), distance sensor, touch sensor, displacement gauge, thickness meter and the like.

When the present invention is applied for the proximity sensor, it can be provided on, for example, an elevator, escalator, toilet seat, automobile bumper, lift mechanism and the like.

Next, more specific descriptions of the electrostatic capacity sensor will be given.

EXAMPLE 1

The electrostatic capacity sensor $1b$ shown in FIG. 3 was manufactured with the following conditions.
[Detection Electrode]
  Material: Aluminum alloy
  Dimensions: of the Detection Plane: 3 cm×150 cm (450 cm$^2$)
  Thickness: 0.2 cm
[Charge Plate]
  Material: Aluminum alloy
  Dimensions: 3 cm×150 cm (450 cm$^2$)
  Thickness: 0.2 cm
[Ground Electrode]
  Material: Aluminum alloy
  Dimensions: 3 cm×150 cm (450 cm$^2$)
  Thickness: 0.2 cm
[Support Material for Detection Electrode, Charge Plate and Ground Electrode]
  Material: Acrylonitrile-butadnene-styrene copolymer (ABS resin)
[Distance $L_2$ between Detection Electrode and Charge Plate]
  $L_2$: 0.2 cm
[Distance $L_3$ between Charge Plate and Ground Electrode]
  $L_3$: 1.5 cm

EXAMPLE 2

An electrostatic capacity sensor $1b$ was manufactured in the same way as in Example 1 except that the distance $L_3$ between the change plate and the ground electrode was changed to 2.0 cm.

EXAMPLE 3

The electrostatic capacity sensor $1h$ was manufactured in the same conditions as in Example 2.
(Comparative Example 1)

An electrostatic capacity sensor was manufactured in the same way as in Example 1 except that the charge plate was omitted, and the dimensions of the detection electrode was changed to 3 cm×3 cm (9 cm$^2$).
<Experiment>

For the electrostatic capacity sensors of Examples 1 to 3 and Comparative Example 1, the detection distance $L_1$ was measured. In this Experiment, the threshold for the comparator 66 of the detection circuit 60 was set equal for all of them. Further, in the electrostatic capacity sensor $1h$ of Example 3, the resistance of the variable resistor 13 was set at 0 Ω short-circuiting, and the capacitance of the variable capacitor 15 was set at 500 μF in one case and was set at 1000 μF in the other case. The result of the experiment was as shown in Table 1 below.

TABLE 1

| | | AREA OF DETECTION PLANE OF DETECTION ELECTRODE [cm$^2$] | DISTANCE $L_2$ [cm] | CAPACITANCE OF VARIABLE CAPACITOR [μF] | RESISTANCE OF VARIABLE RESISTER [Ω] | DETECTION DISTANCE $L_2$ [cm] |
|---|---|---|---|---|---|---|
| EX. 1 | CHARGE PLATE | 450 | 1.5 | — | — | 3 |
| EX. 2 | CHARGE PLATE | 450 | 2.0 | — | — | 4 |
| EX. 3 | CHARGE PLATE | 450 | 2.0 | 500 | 0 | 8 |
| | | | | 100 | 0 | 12 |
| CO. EX. 1 | NO CHARGE PLATE | 9 | — | — | — | 2 |

As shown in Table 1, each of the electrostatic capacity sensors of Examples 1 to 3 had large value for the detection distance $L_1$ since they are equipped with the charge plate. In contrast, the electrostatic capacity sensor of Comparative Example 1 had a smaller value for the detection distance $L_1$.

Further, though the detection plane of the detection electrode has the area of 450 cm², each of the electrostatic capacity sensors of Examples 1 to 3 had constant values for the detection distance. In contrast, though the detection plane of the detection electrode has the area of 9 cm², the electrostatic capacity sensor of Comparative Example 1 had dispersion in the detection distance $L_1$ and the low detection precision.

EXAMPLE 4

An experiment was carried out for each of examples 1 to 3 in the same way as in the above, using two charge plates arranged in the thickness direction of the detection element. In this experiment, the detection distance $L_1$ was further increased, and the detection precision was further improved.

In the above, the electrostatic capacity sensor according to the present invention has been described based on the respective embodiments, but this invention is not limited to these embodiments.

For example, in this invention, the structure of the detection circuit 60 is not limited those shown in the figures.

Further, in this invention, the function of the relay circuit 11 is not limited to those described above. In addition, the relay circuit 11 is not limited to a circuit having a function of stabilizing the sensitivity of the electrostatic capacity sensor, and a circuit having a function of adjusting the sensitivity of the electrostatic capacity sensor. The relay circuit 11 can be used for achieving any other purposes.

Moreover, in this invention, the circuit board may be provided on a section (for example, on the back face, on the side face of the attaching table 8, or the like) other than the plane 32 of the detection electrode 3.

As described in the above, according to the electrostatic capacity sensor of the present invention, the detection element includes the charge plate. Therefore, the sensitivity of the detection element is improved, so that it is possible to increase the detection distance. In addition, the variations in the capacitance of the detection element due to the changes in the ambient conditions can be reduced. In this way, the ratio of signal to noise (the ratio of S/N) can be increased, thereby enabling to improve the detection precision of the electrostatic capacity sensor.

In particular, when a plurality of charge plates are arranged in the direction of the thickness of the detection element, the sensitivity of the detection element is higher than the case where a single charge plate is used. Consequently, it becomes possible to increase the detection distance and to improve the detection precision of the electrostatic capacity sensor.

Further, when the distance between the charge plate and the ground electrode is set to be larger than the distance between the detection electrode and the charge plate, the discharge of charge on the charge plate toward the ground electrode can be suppressed. Therefore, the migration of charge on the charge plate toward the detection electrode is effectively carried out, so that the sensitivity of the detection element can be improved, thereby enabling to increase the detection distance.

Furthermore, when the ground electrode is connected electrically to the negative terminal of the power supply, in particular, when the ground electrode is connected electrically to the negative terminal of the power supply via a relay circuit, charge can be discharged from the ground electrode more effectively compared with the case where the ground electrode is not connected to the negative terminal of the power supply. In this way, the sensitivity of the detection element can be improved. Therefore, the ground electrode becomes substantially free from the influence of the electric charges existing in the atmosphere and the influence of the capacitance between the ground electrode and the ground. As a result, noise due to the variations in the capacitance is reduced, thereby enabling to improve the detection precision of the electrostatic capacity sensor.

What is claimed is:

1. An electrostatic capacity sensor, comprising:

a detection element, including:
      a detection electrode,
      a ground electrode, and
      a charge plate inelastically interposed between the detection electrode and the ground electrode and physically isolated therefrom;

a detector operative to detect changes in capacitance of the detection electrode caused by an object to be detected; and a power supply adapted to supply electrical power to the detector.

2. The electrostatic capacity sensor as claimed in claim 1, wherein the ground electrode is electrically connected to a negative terminal of the power supply.

3. The electrostatic capacity sensor as claimed in claim 1, wherein the ground electrode is electrically connected to a negative terminal of the power supply via a relay circuit.

4. The electrostatic capacity sensor as claimed in claim 3, wherein the relay circuit includes a resister.

5. The electrostatic capacity sensor as claimed in claim 4, wherein the resister is a variable resister.

6. The electrostatic capacity sensor as claimed in claim 3, wherein the relay circuit includes a capacitor.

7. The electrostatic capacity sensor as claimed in claim 6, wherein the capacitor is a variable capacitor.

8. The electrostatic capacity sensor as claimed in claim 3, wherein the relay circuit has a function that adjusts sensitivity of the electrostatic capacity sensor.

9. The electrostatic capacity sensor as claimed in claim 3, wherein the relay circuit has a function that stabilizes sensitivity of the electrostatic capacity sensor.

10. The electrostatic capacity sensor as claimed in claim 1, wherein the sensitivity of the electrostatic capacity sensor is adjusted by adjusting the distance between the charge plate and the ground electrode.

11. The electrostatic capacity sensor as claimed in claim 1, wherein the distance between the charge plate and the ground electrode is set so as to be larger than the distance between the detection electrode and the charge plate.

12. The electrostatic capacity sensor as claimed in claim 1, wherein the detection electrode has a first surface that functions as a detection plane and a second surface which is opposite to the first surface, and wherein the detection circuit is provided on the second surface of the detection electrode.

13. The electrostatic capacity sensor as claimed in claim 1, wherein a plurality of charge plates are arranged along the direction of the thickness of the detection element.

* * * * *